United States Patent [19]

Board

[11] Patent Number: 4,720,027

[45] Date of Patent: Jan. 19, 1988

[54] BICYCLE CROSS-BAR BAG

[76] Inventor: William D. Board, 731-G St. Space #A-10, Chula Vista, Calif. 92010

[21] Appl. No.: 768,353

[22] Filed: Aug. 22, 1985

[51] Int. Cl.⁴ .............................................. B62J 11/00
[52] U.S. Cl. .................................... 224/35; 224/32 R
[58] Field of Search ...................... 224/35, 30 R, 30 A, 224/31, 32 R, 33 A, 36; D3/77

[56] References Cited

U.S. PATENT DOCUMENTS

| 516,724 | 3/1894 | Hunt | 224/35 |
|---|---|---|---|
| 1,485,067 | 2/1924 | Bristol | 224/35 |
| 4,474,386 | 10/1984 | Kanemaki | 224/35 |

Primary Examiner—Henry J. Recla
Assistant Examiner—David Voorhees

[57] ABSTRACT

A bag for mounting on the cross bar of a bicycle. The bag includes flap portions unitary with the bag walls and extending above the bag pocket. The flap portion on one wall being wrapped around the bicycle cross bar and joined together by hook and loop fastener materials to support the bag and its contents. The flap portion on the other wall folds over the top opening of the bag and fastens to the flap on the first wall thereby covering the opening.

1 Claim, 5 Drawing Figures

BICYCLE CROSS-BAR BAG

BACKGROUND OF THE INVENTION

Bicycle riding needs to be encouraged, because it is a non-polluting, energy saving, most economical means of transportation and is one of the best ways to exercise.

With my bag, which can be installed in seconds and rolled up around the cross-bar of the bicycle, when not in use, the problem of carrying lunches, books or tools to school or work or articles from store errands or mearly storage for a sweater or jacket because of a change in the weather has been solved. Stop and go driving wastes more energy and makes most pollution of any type of driving a vehicle and is the most costly. Bicycles can eliminate much of this with the help of my bag.

Retirees can benefit more from the use of my bag than any other age group, because it gives them a purpose to go with the exercise and pleasure of riding a bicycle. They will be surprised when they go for books at the Library and find how much easier it is chaining a bicycle then finding a parking place for a car. I practice what I proclaim. In the past years I have driven my station wagon less than 200 miles a year and I rode a bicycle over 3,000 miles a year. I have found more use for my station wagon to store my bicycle to protect it from the weather and the pollution created by others.

BRIEF SUMMARY OF THE INVENTION

My invention is a new, useful article that offers significant worth over any similar device known to me. Because of my new type of suspension from the entire length of the top of the bag, which I developed, it provides adequate support for a large, one compartment bag with a wide top opening. This invention gives a purpose to riding a bicycle beside pleasure and exercise, by providing a practical and easy way to carry a vast array of small articles, and not so small things, such as the 18 pound watermelon, I carried in one of my bags, from necessities to picnic lunches.

The space under the cross-bar of a bicycle is, in my opinion, the most valuable space on a bicycle, because of it's lowest center of gravity, which does not unbalance the bicycle. It was my desire to use this space to the utmost, which I have, to the extent of approx. 77%.

My bag has a concealed top closure. There are no snaps, buttons or other ugly extrusions and the bag is an esthetic addition to the bicycle by eliminating part of the skeleton appearance if in a blended color or can add a safety factor, by making the bicycle more visible if a brighter color is used. Having a handy place to carry articles can also add to safety instead of carrying packages in hand.

This bag should fill a great need for Retirees who wish for an inexpensive way to get exercise, keep up with community developments and other activites and have a need for storing extra clothing either coming or going and for errands along the way. The cost of fuel becomes of little importance when riding a bicycle.

Prior Art has been discussed in detail in answer to correspondence. I have not seen anything in use or described in any printed matter before or since my development of this article in Prior Art which approaches any way close to the utility value of my invention.

BRIEF DESCRIPTION OF THE DRAWING

In the drawing

The various parts are numbered as follows: No. 1 is the Front, No. 2 is the Back, No. 3 is the Band of approximately four inches in width (finished size) joining together the front and back of the bag, No. 4 is Velcro, No. 5 is a Strap secured to the center of the Band and positioned to wrap around the lower part of the front bicycle bar, and No. 6 is a similar strap secured to the center of the Band and positioned to wrap around the lower part of the rear bicycle bar (not shown in FIG. 1). Both No. 5 and No. 6 Straps have dual purposes since they are also used to wrap around the bag when rolled up either on or off the bicycle. FIG. 2 is an open, end view showing the top of the Front (1) and the Back (2). The lower part of these are matching from the beginning to the end of the Band (3) located relative to the lower Velcro (4) strip on the inside face of the Back. FIG. 3 shows the top of the Back with Velcro closure, without the cross-bar, and the Velcro exposed on the outside of the bag on top of the cross-bar space for closure and partly closed by Velcro on the inside face of the Front of the bag. FIG. 4 shows Strap (5) attached to the center of the Band with one end of the Strap turned over to show the Velcro on the under side of the Strap. FIG. 5 shows Strap (6) which is hidden from view in FIG. 1 same as described in FIG. 4 above.

DETAILED DESCRIPTION OF THE PREFERRED EMBODIMENT

Figure 2:
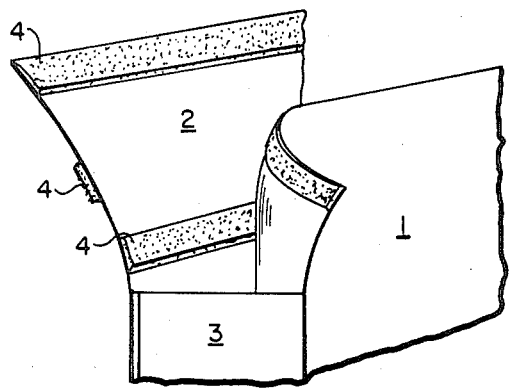
FIGS. 2, 3, 4 and 5 have been added to show details.
Figure 3:
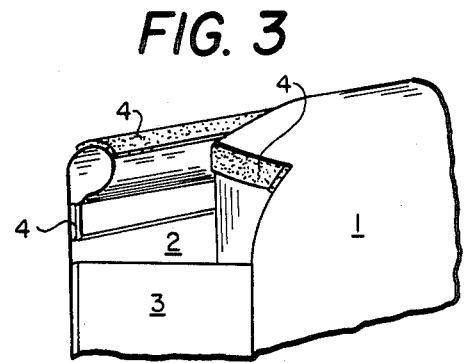
Figure 1:
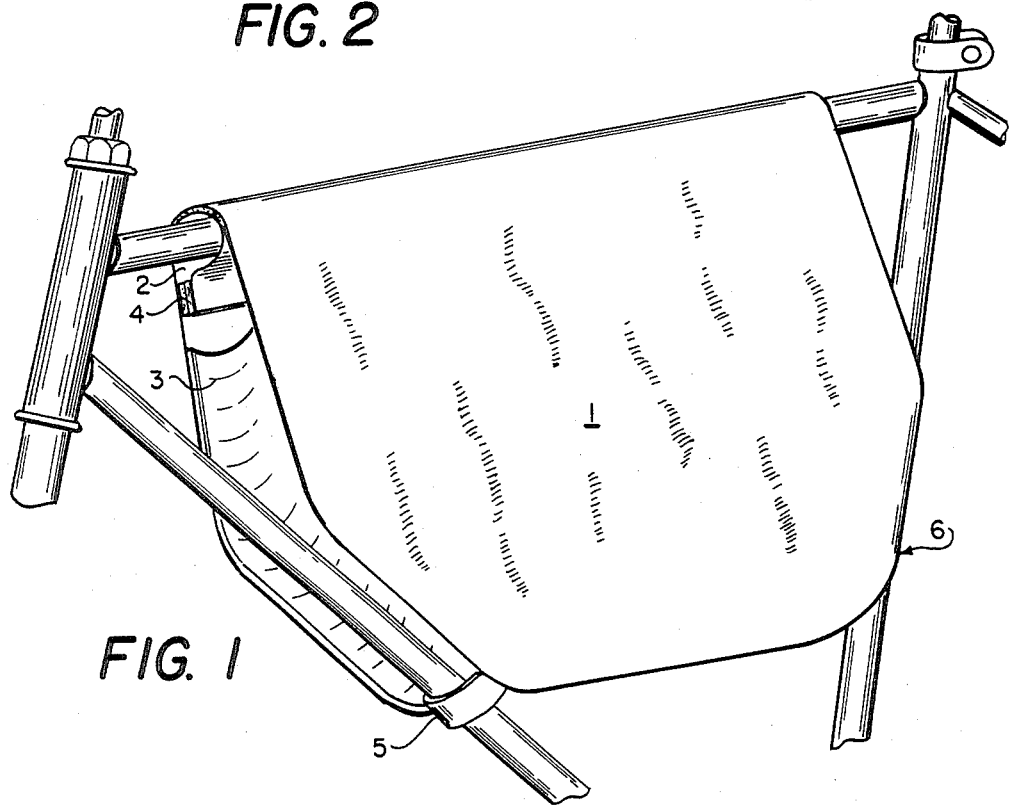
FIG. 1 is a total perspective view of the Bicycle Cross-Bar Bag, installed and unrolled.
Figure 4:
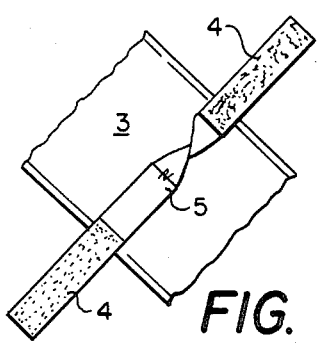
Figure 5:
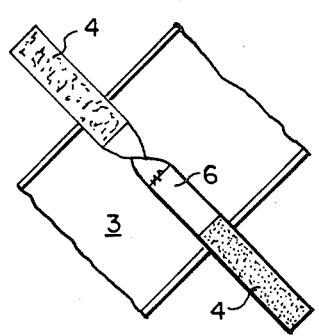

The Band was purposely shown beginning below the Velcro strip for simplication in revealing important details. To make the Bag the most weather proof, the Band should begin and end as close to the bottom of the cross-bar as possible, which would be about the top of the Velcro strip under the cross-bar. The finished sewing of the Band to the Front and Back is best with the Band laying against these. If desired, a seam may be added clipping the top center of the Band together down the inside face for about 3 inches and about ¼ inch in from the center. Both of these actions will help make a neater roll-up and tend to keep the Band under the cross-bar, which will help prevent rain from getting inside the Bag. These bags can be made of semi-rigid material, in part, but for the best roll-up a flexible fabric should be used, which can be in matching colors or bright colors, if safety becomes a determining factor.

I claim:

1. A bag for use in combination with a bicycle frame, comprising:

a front bag wall having perimeter edges and an inside face and an outside face, a back bag wall having perimeter edges and an inside face and an outside face, an elongated narrow band positioned between the perimeter edges of the front bag wall and the back bag wall and joining the front bag wall and the back bag wall together along side and bottom portions of the perimeter edges, forming an open-topped bag structure, said front bag wall and said back bag wall each having a flap formed unitarily with each front bag wall and said back bag wall and extending upwardly from said open-topped bag structure, said front bag wall attached flap having two mating hook and loop fastener material strips affixed to said front bag wall inside face in a vertically spaced relationship such that said front bag wall flap can be folded along a line parallel to the top of said open-topped bag structure to encircle a bicycle cross-bar, such that the two mating hook and loop fastener strips may join together to attach said front bag wall to a bicycle cross-bar, said front bag wall flap further having a hook and loop fastener material strip along the outside face of said front bag wall flap, said back wall flap having a hook and loop fastener material strip along the inside face of said back bag wall flap, whereby, the hook and loop fastener material on the side face of said back bag wall flap may be attached to the hook and loop fastener material on the outside face of said front wall flap to form a cover for the open-topped bag structure while the open-topped bag structure is mounted on a bicycle cross bar.

* * * * *